April 13, 1965   R. L. FLUCKER ETAL   3,177,990
GRID TYPE STRUCTURES
Filed Oct. 11, 1962   2 Sheets-Sheet 1
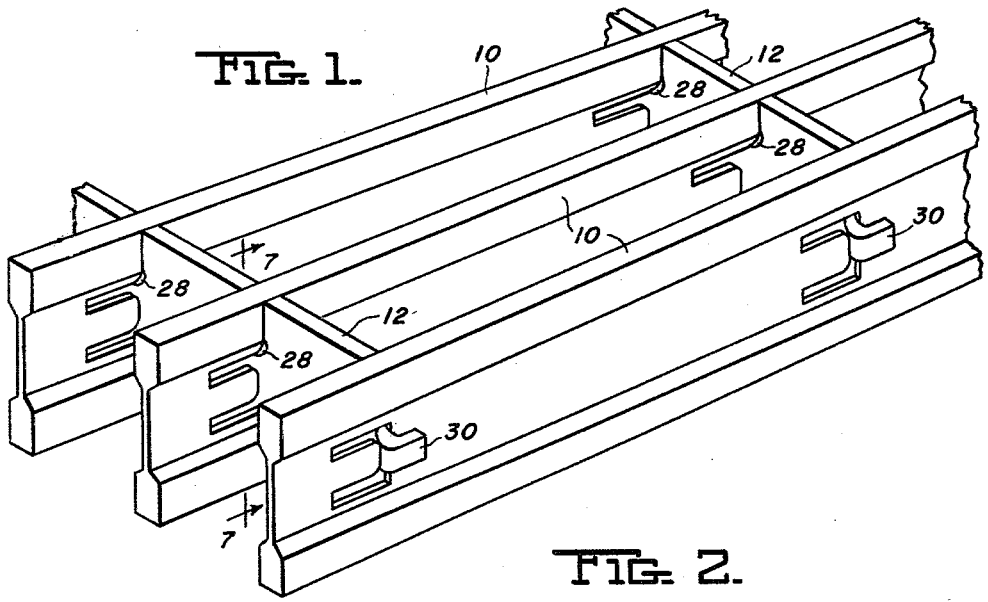
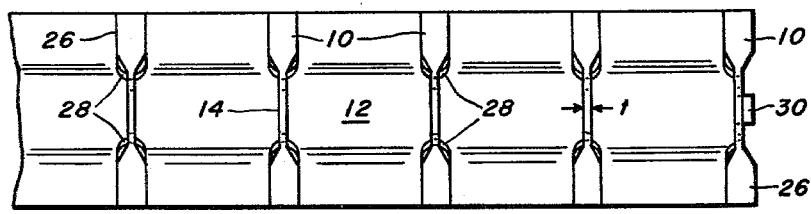
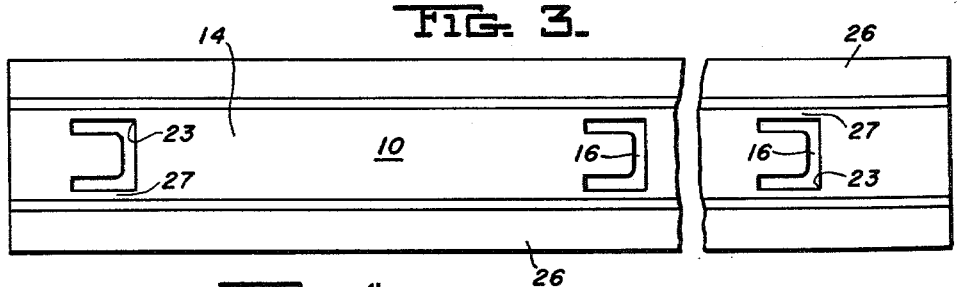
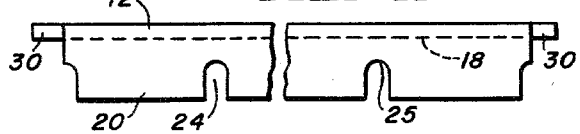
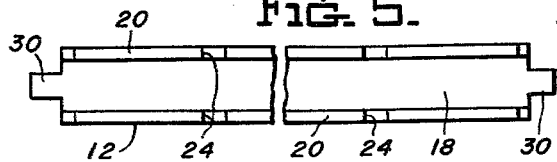
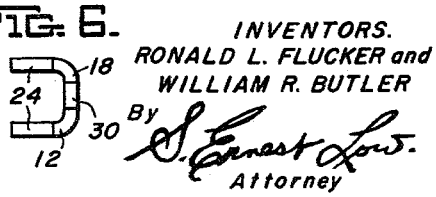
INVENTORS.
RONALD L. FLUCKER and
WILLIAM R. BUTLER
By
S. Ernest Low.
Attorney April 13, 1965 R. L. FLUCKER ETAL 3,177,990
GRID TYPE STRUCTURES
Filed Oct. 11, 1962 2 Sheets-Sheet 2
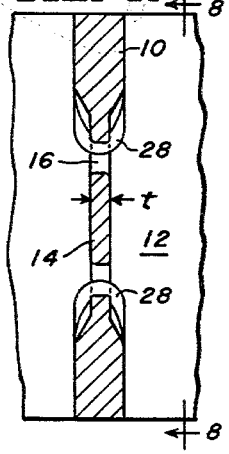
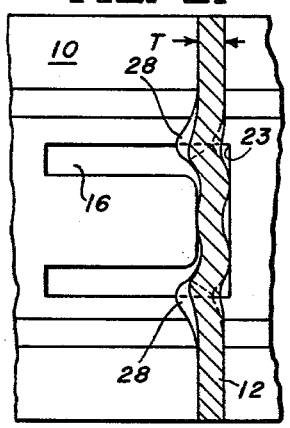
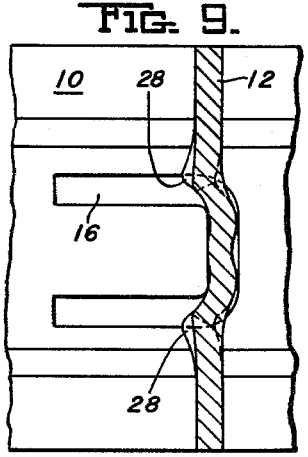
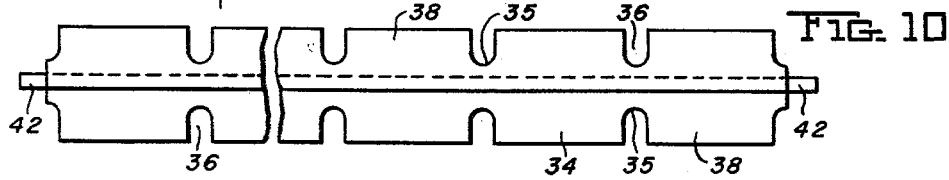
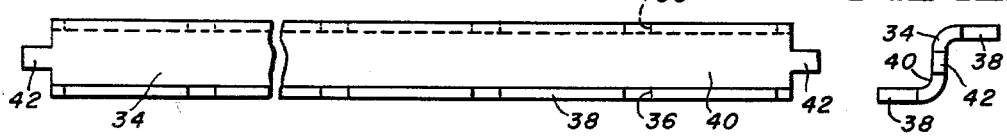
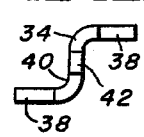
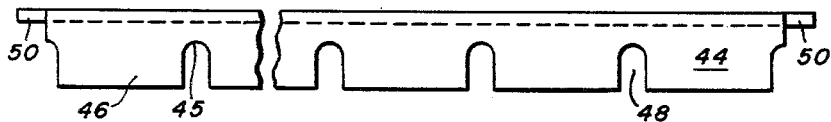
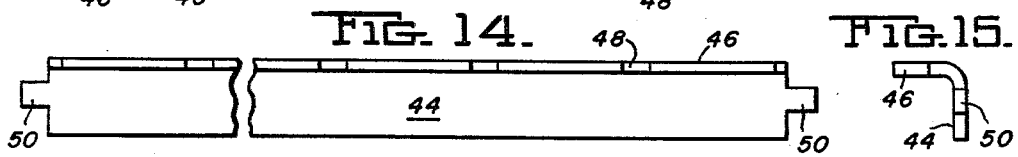
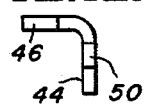
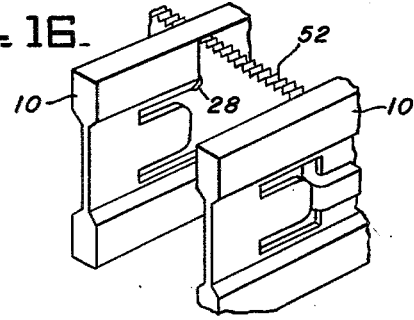
INVENTORS.
RONALD L. FLUCKER and
WILLIAM R. BUTLER
By S. Ernest Low.
Attorney United States Patent Office 3,177,990
Patented Apr. 13, 1965

1

3,177,990
GRID TYPE STRUCTURES
Ronald L. Flucker and William R. Butler, Pittsburgh, Pa., assignors to Aluminum Company of America, Pittsburgh, Pa., a corporation of Pennsylvania
Filed Oct. 11, 1962, Ser. No. 229,862
10 Claims. (Cl. 189—82)

This invention relates in general to unitary structures of the open grid or lattice type adaptable for use in architectural installations, including interior partitions and dividers, exterior sun-deflecting screens, overlays for existing exterior and interior building walls, where ornamental self-supporting strength and rigidity are the chief desiderata, as well as for use as open grilles or gratings suitable for shelving, area ways, floors, bridge and ship decks, catwalks, stair treads, industrial type stationary and mobile platforms and runways, and similar load and traffic-bearing surfaces, wherein structural strength and rigidity against direct and reverse bending resulting from applied loading normal to the surfaces of such structures are essential requirements.

In view of the many possible end uses of open type grid structures, examples of which have been hereinabove enunciated, it is within the concept of the invention that the basic unitary structures, hereinafter described in specific detail, find ready applicability in decorative architectural usage, as well as in fundamentally engineered load-carrying structures.

The open grid structures of the invention are particularly adapted in their fabrication from ferrous and non-ferrous metals and their alloys, and when so constructed have eliminated the need for conventional joining practices represented by welding, riveting, bolting and similar conventional mechanical joining devices and practices. On the other hand, non-metallic materials, which inherently exhibit many of the hot and cold working characteristics of metals and their alloys, are not intended to be excluded from the invention.

One of the objects of the invention is to provide a unitary open grid panel, grille or structural grating which requires a minimum number of dissimilar elements which are easy to fabricate and assemble and which have been standardized to the point that large volume production is possible at minimum cost.

Another object of the invention is to provide a unitary metallic open grid type lattice or grating structure, or panel, which is devoid of mechanically bolted, welded or riveted connection between the separate elements thereof.

A still further object of the invention is to provide a novel cross-laced open grid type grating structure in which transverse or cross-lacing elements thereof serve the double purpose of accurately spacing a plurality of load-bearing elements angularly disposed in respect thereto, as well as acting in a manner to provide unitary static noise-less assembly under direct and reverse bending of the open grid structure so constructed.

Other objects and advantages of the invention will be apparent to those skilled in the art to which the invention appertains on consideration of the following detailed description and appended illustrations, in which:

FIG. 1 illustrates a fragmentary perspective view of a preferred assembled unitary open grid type panel or grating structure fabricated in accordance with the basic concepts supporting the invention;

FIG. 2 illustrates an end elevational view of a portion of the assembled grid or grating structure of FIG. 1;

FIG. 3 illustrates a side elevational view of a preferred form of one of the similar primary or load-bearing elements of the assembled grid or grating structure of FIGS. 1 and 2;

2

FIG. 4 illustrates a top plan view of a preferred form of one of the similar transverse secondary or cross-lacing elements employed in the assembled grid or grating structure of FIGS. 1 and 2;

FIG. 5 illustrates a front elevational view of the cross-lacing element of FIG. 4;

FIG. 6 illustrates an end elevational view of the transverse cross-lacing element of FIG. 5;

FIG. 7 illustrates a fragmentary sectional elevation to slightly enlarged scale taken on the plane 7—7 of FIG. 1;

FIG. 8 illustrates a fragmentary sectional elevation taken on the plane 8—8 of FIG. 7;

FIG. 9 illustrates a fragmentary sectional elevation similar to FIG. 8, but illustrating a modification of that structure;

FIG. 10 illustrates a top plan view of a secondary transverse or cross-lacing element which may be substituted for the cross-lacing element of FIGS. 4, 5 and 6;

FIG. 11 illustrates a front elevational view of the transverse cross-lacing element of FIG. 10;

FIG. 12 illustrates an end elevational view of the transverse cross-latching element of FIG. 11;

FIG. 13 illustrates a top plan view of a third form of secondary transverse or cross-lacing element which may be substituted for either cross-lacing element of FIGS. 4 or 10;

FIG. 14 illustrates a front elevational view of the cross-lacing element of FIG. 13;

FIG. 15 illustrates an end elevational view of the cross-lacing element of FIG. 14;

FIG. 16 illustrates a fragmentary perspective view of a modified assembly unitary open grid panel or grating structure fabricated in accordance with the invention and incorporating any one of the transverse cross-lacing elements of FIGS. 4, 10 or 13.

Basically, open type grid panels, lattices or grating structures of the invention comprise a plurality of preferably substantially identical bar elements or members, termed herein generically primary bar elements or members, and specifically load-bearing elements or members in the case of load and traffic-bearing grating structures, in unitary parallel spaced and secured assembly by means of substantially identical secondary transverse cross-lacing elements or members threaded through aligned apertures provided and confined within the depth of the first-mentioned primary or load-bearing bar elements, unitary and rigid static relationship of the primary and secondary transverse cross-lacing elements of an open grid or grating structure thus formed being accomplished in substantial part by angular deflection of the cross-lacing elements between the parallel spaced primary bar elements, as well as by localized deformation and displacement of the secondary cross-lacing elements adjacent areas of interfering and engaging intersection of the primary and secondary elements during angular deflection of at least one angularly disposed flange of the transverse cross-lacing elements.

In more specific terms, the secondary transverse cross-lacing elements or members are intentionally selected, and/or initially fabricated, to preferably provide an axially uniform transverse cross-sectional configuration comprising a web and at least one integral flange angularly disposed thereto, the flange or flanges, where more than one is provided, being slotted at spaced intervals along the axial length thereof before threading the same through the aligned apertures in the webs of a plurality of parallel spaced primary or load-bearing elements to register the slots in the flange or flanges with the parallel spaced primary elements. In this registered threaded condition, the unslotted or imperforate axial lengths of the flange or flanges are angularly deflected out of registry with the apertures through which the cross-lacing elements had been threaded, which deflection of the flange or flanges provides definite spacing and permanent locking of the assembled structure thus formed.

Referring now to the several embodiments of the invention illustrated in the appended drawings, the open grid panels or grating structures depicted therein preferably comprise parallel spaced primary or load-bearing elements 10 in unitary rigid and secured assembly with secondary transverse cross-lacing elements 12. The primary bar elements 10 are generally rectangular in transverse cross-section and have been preferably selected in substantially the identical symmetrical and axially uniform transverse cross-sectional configuration of an I-section or beam. Within the depth of the web portions 14 of the load-bearing elements 10, apertures 16 are provided in substantial cross-sectional conformity and threading clearance outline to the transverse cross-sectional configuration of the cross-lacing elements 12 in their initially fabricated configuration.

It will be observed on reference to FIGS. 4, 5 and 6, that the cross-lacing member or element 12 has been initially selected in the form of a channel or C-shaped member of axially uniform transverse cross-sectional configuration having a web 18 and integral flanges 20, the latter being preferably disposed normal to the web 18 and also preferably curvilinearly connected thereto. The flanges 20 are punched, notched, or otherwise fabricated to provide marginally open entrance slots 24 in accordance with desired and selected spacing between the primary or load-bearing elements 10 of an assembled unitary grid structure, the width across the slots 24 being preferably selected a few thousandths under the width of the flanges 26 of the primary I-section bar elements 10 to provide interference therewith in an assembled grid structure. In addition, the web 18 of each cross-lacing element 12 is reduced in width at its termini to initially provide end tabs 30 extending axially beyond the flanges 20 in substantially the flat plane of the web 18.

Assembly and unitary static securement of the open grid panel or structure of FIG. 1 comprises the steps of threadingly inserting the C-shaped cross-lacing elements 12 through the aligned substantially similarly shaped apertures 16, confined within the webs 14 of the primary or load-bearing elements 10, with the slots 24 in the flanges 20 of the cross-lacing elements 12 in coincidence or registry with the flanges 26 of the primary elements 10. The portions of the flanges 20 between the slots 24, as best viewed in FIGS. 1, 4, 5 and 6, are thereafter angularly deflected from their substantially horizontal position (FIGS. 4 and 6) out of registry with the portions of the apertures 16 substantially threadingly complementary thereto into position to preferably bear flushly and tightly against the opposite parallel side surfaces of the flanges 26 (FIGS. 1 and 2) of the primary or load-bearing elements 10, the end tabs 30 being also deflected or angularly bent into substantially flush surface contact with the outwardly disposed flat surfaces presented by the webs 14 of the outermost primary bar elements 10 in any selected width of grating, lattice, or grid structure fabricated in accordance with the invention. In this connection, the width of the slots 24 in selected interference with the side surfaces of the flanges 26 insure an interference fit between the opposite exposed surfaces of flanges 26 and oppositely disposed side walls of the slots 24.

It has been discovered in the development of the invention, and particularly as a result of laboratory loading tests conducted on a grating developed for use as a load-carrying grating subjected to direct and reverse bending stresses, that superior strength, rigidity and load-carrying capacity per unit weight of the grating structure could be achieved when certain basic structural features and relationships are incorporated in structures falling within the scope of the invention.

For example, it was discovered that the outlining configuration of the apertures 16, confined within the depth of the web 14 of the load-bearing bars 10, should conform to substantially the exterior surface contour of the initial cross-sectional surface of the cross-lacing elements 12, although the apertures may otherwise be square-cornered, as at 23 (FIG. 3). It will be understood, however, that the apertures 16 would normally provide a few thousandths clearance in outline and cross-sectional area to that of the transverse cross-sectional area and outline of each of the cross-lacing elements for ease of threading assembly therethrough. In addition, it was found to be a desirable factor and strength-insuring feature to provide a maximum height of uniform web 14 in the long transverse vertical axis of a load-bearing element 10 to insure confinement of the depth of the aperture 16, in the same vertical axis, within and slightly less than the uniform web thickness depth of its web 14, thus insuring no reduction in the transverse cross-sectional area of the load-bearing elements 10 by removal of material of the flanges 26 and the web 14 immediately adjacent thereto, as best illustrated at 27 in FIG. 3. In fact the areas 27, depicting imperforate portions of the web 14 identified thereby, have been found to preferably have a minimum depth of uniform web thickness within the range ½ to 1½ "$t$," where "$t$" represents the uniform thickness of web 14, particularly in gratings to be employed for traffic and load-carrying installations.

A further cardinal feature of the invention concerns the inwardly extending depth of the slots 24 in the flange or flanges 20 of a transverse cross-lacing element. It was determined in this respect that the slots 24 in the flange or flanges 20 should terminate a distance short of the interior surface of the web 18 of each cross-lacing element 12 to thereby insure positive displacement of initially imperforate material of the flanges 20 to form an outwardly struck arcuate saddle formation 28 (FIGS. 7 and 8) extending laterally on each side of the web 14, as a result of angular deflection of the flanges 20 and penetration of the web 14 of the load-bearing or primary element 10 into the unslotted areas of the flanges 20 adjacent the root surfaces of the slots 24. It will be observed from FIGS. 7 and 8 that angular upward deflection of a flange or flanges 20 results in the aforesaid penetration of the edge defining an end wall of the aperture 16 with accompanying lateral displacement of the unslotted root areas of the flange 20 to provide the aforesaid saddle formation 28. Aiding in the formation of the displaced saddle formations 28, and preventing uncontrolled tearing during their formation, has been found to result when the roots of the slots 24 are curvilinear, as indicated at 25.

Formation of the saddles 28 can also be aided by selecting a uniform thickness "$T$" for the cross-lacing element 12, as well as selection of a somewhat softer material therefor, as compared to the hardness of the material of the primary or load-bearing element 10. A thickness "$T$" appreciably greater than "$t$" and approximately conforming to the formula "$T$"=1 to 3 "$t$" has been found to be a preferable, although not mandatory, dimensional relationship assuring penetration of the web 14 of the primary or load-bearing element 10 into and lateral transformation by deformation of the unslotted areas adjacent the roots of the slots 24 in the flanges 20 of a cross-lacing element 12 to provide the saddle formations 28.

Wedging rigidity and elimination of looseness between the elements 10 and 12 adjacent their cruciform jointure has been assured by the structural characteristics and relationship between the elements 10 and 12 resulting from the locally deformed and outwardly struck or gathered material forming the saddle formations 28. It will also be observed that the upper and lower saddle formations 28 serve to exert a wedging, spreading or separating force against the upper and lower surfaces defining the oppositely disposed top and bottom walls of apertures 16 in the primary or load-bearing elements 10 (FIGS. 7 and 9), in addition to lateral binding of the cross-lacing elements 12 against opposite lateral surfaces of the web 14 of the load-bearing element 10 in the areas 27 above and/or below the apertures 16 in the web 14 of the primary elements 10.

It is also a preferable structural feature satisfying the invention that the uniform transverse thickness of the cross-lacing elements 12 be such that the terminal tabs 30 thereof be equal in thickness to, or less than, the overhanging lateral marginal portions of flanges 26 of the I-section primary load-bearing elements 10 in the event singularly fabricated unitary sections of open grid type gratings, or similar structures, are to be laid or erected in symmetrical registry and in outermost abutting flange 26 arrangement. This will be appreciated on reference to FIG. 2, wherein the outer exposed surface of the angularly bent tab 30 lies in substantially the plane of the outer surfaces of the outermost flanges 26 to thereby permit flush bearing contact thereof with similar surfaces of flanges 26 of an adjacent similar grid structure in abutting side-by-side assembly therewith.

Similar open grid panel or grating structures can also be provided by substituting the generally Z-shaped or generally inverted L-shaped cross-lacing elements 34 (FIGS. 10, 11 and 12) or 44 (FIGS. 13, 14 and 15), respectively, for the above-described generally C-shaped cross-lacing elements 12.

The generally Z-shaped cross-lacing elements 34 would be provided with slots 36 in its oppositely directed flanges 38 with the slots 36 preferably terminating in curvilinear end or root walls 35 short of the adjacent surfaces of the connecting web 40, as in the case of the C-shaped cross-lacing element 12, for the same purpose and reasons described in regard to the provision of the saddle formations 28. In such a substitution, the apertures in the webs of the primary or load-bearing elements employing the generally Z-shaped cross-lacing elements 34 would be selected in substantial complementary conformity to the initial transverse cross-sectional area of the Z-sections and extending end tabs 42 would be provided to complete the structure.

Similarly, the inverted generally L-shaped cross-lacing element 44 would have its horizontal flange 46 slotted at 48, with the slots preferably terminating in curvilinear end or root walls 45 short of the vertical leg of the L-section, for the same purpose and reason described in regard to the above stated saddle formations 28. Substitution of the inverted generally L-section cross-lacing element 44 would also entail providing end tabs 50 and selecting substantially complementary L-shaped apertures in the webs of primary or load-bearing elements employed therewith.

FIG. 9 is a showing substantially similar to FIG. 8 except that the square corners 23 (FIG. 3) of the apertures 16 in the webs 14 of the primary load-bearing elements have been replaced by a radiused outer wall outline in substantial conformity with the curvilinear or arcuate connection of the web and flange or flanges in all of the cross-lacing elements 12, 34 and 44.

Inspection of FIGS. 7, 8 and 9 will reveal that the cross-lacing elements 12 thereof are of undulatory transverse cross-sectional configuration following angular deflection of their flange or flanges out of registry with the complementary horizontal portions of the apertures 16, and as such, it has been found that this undulatory condition of the cross-lacing elements has resulted in providing bearing surface contact between the undulating web portions of the cross-lacing elements and opposite walls of the clearance apertures in the web of the primary or load-bearing elements complementary thereto. The net result has been to increase the tightness of the cruciform intersecting joints in the open grid type structures of the invention. However, and if desired, the flange or flanges of the cross-lacing elements may be angularly deflected and transformed into substantially the vertical plane of their initially fabricated webs through selection of bending and back-up tools or dies which would be operated to bend the flanges of the cross-lacing elements against a rigid substantially flat back-up block positioned in the plane of the exposed web surfaces thereof.

FIG. 16 is applicable to an open type grid grating made to comply with any of the above-described grid systems, but particularly adapted to the use of the gratings so produced when employed as traffic bearing surfaces. In this latter environment the cross-lacing elements may be initially serrated at 52, along the imperforate or unslotted axial lengths of a flange thereof to provide an upper antislip surface.

Practice of the invention has found particular adaptability in the application of wrought aluminum and its alloys for the material of the primary or load-bearing elements and transverse cross-lacing elements. For example, and to obtain advantage of a hardness relationship benefiting the angular deflection of the flange or flanges of a transverse cross-lacing element, and accompanying penetration of the imperforate root areas adjacent the slots in the aforesaid flange or flanges by the upper and/or lower edge walls of the apertures in the web of a primary or load-bearing element, heat-treated and aged aluminum base alloys in extruded form within the percent composition by weight range .4 to .8 silicon, .7 iron, .15 to .4 copper, .15 manganese, .8 to 1.2 mangesium, .15 to .35 chromium, .25 zinc, .15 titanium, balance aluminum and impurities normally present therein for the primary or load-bearing elements 10 (FIG. 1), and heat-treated and aged aluminum base alloys in extruded form within the percent composition by weight range .2 to .6 silicon, .35 iron, .1 copper, .1 manganese, .45 to .9 magnesium, .1 chromium, .1 zinc, .1 titanium, balance aluminum and impurities normally present therein, for the secondary cross-lacing elements, have responded with excellent results in the practice of the invention in the fabrication of traffic and load-bearing structural open type gratings exhibiting superior strength, rigidity and load-carrying capacity per unit weight of the structure so fabricated. In this connection, the aforesaid heat-treated and aged extruded wrought aluminum alloy primary load-bearing elements have been characterized by a Brinell hardness number of at least 95 (500 kg. load—10 mm. ball), and the aforesaid heat-treated and aged extruded wrought aluminum alloy secondary cross-lacing elements have been characterized by a Brinell hardness number within the range 60 to 74 (500 kg. load—10 mm. ball), a Brinell hardness number difference, favoring the primary load-bearing elements, within the range 20 to 40 being representative of a favorable condition in the practice of the invention.

While specific embodiments of structures and practices have been selected for purposes of illustrating and describing the invention, it will be understood by those versed in the art to which the invention is addressed that various changes therein and embodiments thereof can be made without departing from the scope of the appended claims.

What is claimed is:

1. An open grid structure of the class described comprising a plurality of parallel spaced primary elements of generally uniform rectangular transverse cross-section, parallel spaced secondary transverse cross-lacing elements adapted to unitarily connect aid primary elements in rigid structural assembly, said cross-lacing elements being initially defined in transverse cross-section by a web and at leat one angularly extending flange portion integral and axially coextensive with said web, axially spaced and registered apertures transversely through the transverse thickness dimension of the primary elements confined within the depth of the same, said apertures each being substantially complementary in outline and area to the transverse cross-section of each of the cross-lacing elements and receiving the cross-lacing elements extending therethrough with the flange of each thereof substantially parallel to one marginal edge surface of each of the parallel spaced primary elements, the flange of each cross-lacing element being provided with axially spaced marginal open entrance slots interrupting the contiguous axial length thereof, the slots each having a depth less than the uniform width of the flange of each cross-lacing element and providing an imperforate flange area adjacent the root of each slot within the projected lateral boundaries thereof, said flange of each cross-lacing element between the slots therein being angularly deflected out of registry with those portions of the apertures in the primary elements receiving the same to thereby provide interference displacement of the imperforate areas adjacent the root of each slot in the flange of a cross-lacing element, said displaced material of the flange constituting an outwardly struck contiguous saddle formation embracing each primary element laterally of and outwardly beyond each aperture therethrough, as well as embracing the wall of the aperture contiguously therewith, and said saddle formation in each instance contactingly wedging the cross-lacing elements within the apertures in the spaced parallel primary elements receiving the same against opposite walls thereof adjacent opposite marginal edges of each primary element.

2. An open grid structure of the class described comprising a plurality of parallel spaced primary elements of generally uniform rectangular transverse cross-section, parallel spaced secondary transverse cross-lacing elements adapted to unitarily connect said primary elements in rigid structural assembly, said cross-lacing elements being initially defined in transverse uniform thickness cross-section by a web and at least one angularly extending flange portion integral and axially coextensive with said web, axially spaced and registered apertures transversely through the transverse thickness dimension of the primary elements confined within the depth of the same, said apertures each being substantially equal in area to the transverse cross-section of each of the cross-lacing elements and receiving the cross-lacing elements extending therethrough with the flange of each thereof substantially parallel to one marginal edge surface of each of the parallel spaced primary elements, the flange of each cross-lacing element being provided with axially spaced marginal open entrance slots interrupting the contiguous axial length thereof, the slots each having a depth less than the uniform width of the flange of each cross-lacing element and providing an imperforate flange area adjacent the root of each slot within the lateral projected boundaries thereof, said flange of each cross-lacing element between the slots therein being angularly deflected out of registry with those portions of the apertures in the primary elements receiving the same to thereby provide interference displacement of the imperforate areas adjacent the root of each slot in each flang of a cross-lacing element, said displaced material of the flange constituting an outwardly struck contiguous saddle formation embracing each primary element laterally of and outwardly beyond each aperture therethrough, as well as embracing the wall of the aperture contiguous therewith, the uniform transverse thickness dimension of each of the cross-lacing elements being substantially equal to 1 to 3 times the uniform transverse thickness dimension of each of the primary elements, and said saddle formation in each instance contactingly wedging the cross-lacing element within the apertures in the spaced parallel primary elements receiving the same against opposite walls thereof defining each aperture in substantially the transverse long axis of the web of each cross-lacing element.

3. An open grid structure of the class described comprising a plurality of parallel spaced primary elements of generally uniform rectangular transverse cross-section, parallel spaced secondary transverse cross-lacing elements adapted to unitarily connect said primary elements in rigid structural assembly, said cross-lacing elements being initially defined in uniform thickness transverse cross-section by a web and at least one angularly extending flange portion integral and axially coextensive with said web, axially spaced and registered apertures transversely through the transverse thickness dimension of the primary elements confined within the depth of the same, said apertures each being substantially equal in outline and area to the transverse cross-section of each of the cross-lacing elements and receiving the cross-lacing elements extending therethrough with the flange of each thereof substantially parallel to one marginal edge surface of each of the parallel spaced primary elements, the flange of each cross-lacing element being provided with axially spaced marginal open entrance slots interrupting the contiguous axial length thereof, the slots each having a depth less than the uniform width of the flange of each cross-lacing element, terminating in a rear curvilinear wall, and providing an imperforate flange area adjacent the root of each slot, said flange of each cross-lacing element between the slots therein being angularly deflected out of registry with those portions of the apertures in the primary elements receiving the same to thereby provide interference displacement of the imperforate areas adjacent the root of the slots in each flange of a cross-lacing element, said displaced material of the flange constituting an outwardly struck contiguous saddle formation embracing each primary element laterally of and outwardly beyond each aperture therethrough, as well as embracing the wall of the aperture contiguous therewith, the uniform transverse thickness dimension of each of the cross-lacing elements being substantially equal to 1 to 3 times the uniform transverse thickness dimension of each of the primary elements, and said saddle formation in each instance contactingly wedging the cross-lacing element within the apertures in the spaced parallel primary elements against the opposite walls thereof defining each aperture in substantially the transverse long axis of the web of each cross-lacing element.

4. An open grid structure of the glass described comprising a plurality of parallel spaced primary elements of generally uniform rectangular transverse cross-section, parallel spaced secondary transverse cross-lacing elements adapted to unitarily connect said primary elements in rigid structural assembly, said cross-lacing elements being initially defined in transverse cross-section by a web and a pair of parallel separated flanges angularly disposed in respect to the web, axially spaced and registered apertures transversely through the transverse thickness dimension of the primary elements confined within the depth of the same, said apertures each being substantially complementary in outline and area to the transverse cross-section of each of the cross-lacing elements and receiving the cross-lacing elements extending therethrough with the flanges thereof substantially parallel to opposite parallel marginal edges of each of the parallel spaced primary elements, the flanges of each cross-lacing element being provided with axially spaced marginal open entrance slots interrupting the contiguous axial length thereof, the slots each having a depth less than the uniform width of the flanges of each cross-lacing element and providing an imperforate area adjacent the root of each slot, said flanges of each cross-lacing element between the slots therein being angularly deflected out of registry with those portions of the apertures in the primary elements receiving the same to thereby provide interference displacement of the imperforate areas adjacent the root of the slots in each of the flanges of a cross-lacing element, said displaced material of the flanges constituting an outwardly struck contiguous saddle formation embracing each primary element laterally of and outwardly beyond each aperture therethrough, as well as embracing the wall of the aperture contiguous therewith, and said saddle formation in each instance contactingly wedging the cross-lacing elements within the apertures in the spaced parallel primary elements against the opposite walls thereof adjacent opposite parallel marginal edges of each primary element.

5. An open grid structure of the class described comprising a plurality of parallel spaced primary elements of generally uniform rectangular transverse cross-section, parallel spaced secondary transverse cross-lacing elements adapted to unitarily connect said primary elements in rigid structural assembly, said cross-lacing elements each being initially defined in transverse C-shaped cross-section, axially spaced and registered apertures extending through the transverse thickness dimension of the primary elements and confined within the depth of the same, said apertures each being substantially complementary in outline and area to the transverse C-shaped cross-section of each of the cross-lacing elements and receiving the cross-latching elements extending therethrough with the flanges thereof substantially parallel to opposite parallel marginal edges of each of the parallel spaced primary elements, the flanges of each cross-lacing element being provided with axially spaced marginal open entrance slots interrupting the contiguous axial length thereof, the slots each having a depth less than the uniform width of the flanges of each cross-lacing element and providing an imperforate area adjacent the root of each slot within the projected lateral boundaries thereof, said flanges of each cross-lacing element between the slots therein being angularly deflected out of registry with those portions of the apertures in the primary elements receiving the same to thereby provide interference displacement of the imperforate areas adjacent the root of the slots in each of the flanges of a cross-lacing element, said displaced material of the flanges constituting an outwardly struck contiguous saddle formation embracing each primary element laterally of and outwardly beyond each aperture therethrough, as well as embracing the wall of the aperture contiguous therewith, and said saddle formation in each instance contactingly wedging a cross-lacing element within the apertures in the spaced parallel primary elements against the opposite walls thereof defining each aperture in substantially the transverse long axis of the web of each cross-lacing element.

6. An open grid structure of the class described comprising a plurality of parallel spaced primary elements of generally uniform rectangular transverse cross-section, parallel spaced secondary transverse cross-lacing elements adapted to unitarily connect said primary elements in rigid structural assembly, said cross-lacing elements each being initially defined in transverse C-shaped cross-section, axially spaced and registered apertures extending through the transverse thickness dimension of the primary elements and confined within the depth of the same, said apertures each being substantially complementary in outline and area to the transverse C-shaped cross-section of each of the cross-lacing elements and receiving the cross-lacing elements extending therethrough with the flanges thereof substantially parallel to opposite parallel marginal edges of each of the parallel spaced primary elements, the flanges of each cross-lacing element being provided with axially spaced marginal open entrance slots interrupting the contiguous axial length thereof, the slots each having a depth less than the uniform width of the flanges of each cross-lacing element, terminating in a curvilinear end wall, and providing an imperforate area adjacent the root of each slot, said flanges of each cross-lacing element between the slots therein being angularly deflected out of registry with those portions of the apertures in the primary elements receiving the same to thereby provide interference displacement of the imperforate areas adjacent the root of the slots in each of the flanges of a cross-lacing element, said displaced material of the flanges constituting an outwardly struck contiguous saddle formation embracing each primary element laterally of and outwardly beyond each aperture therethrough, as well as embracing the wall of the aperture contiguous therewith, and said saddle formation in each instance contactingly wedging a cross-lacing element within the apertures in the spaced parallel primary elements against the opposite walls thereof defining each aperture in substantially the transverse long axis of the web of each cross-lacing element.

7. An open architectural grid structure of the class described comprising a plurality of parallel spaced similar primary elements of substantially I-shaped transverse cross-section, parallel spaced secondary transverse cross-lacing elements adapted to form a cruciform interlocking unitary rigid assembly with the primary elements, said cross-lacing elements being initially defined in transverse cross-section by a web and a pair of integral spaced parallel flanges extending therefrom, axially spaced and aligned apertures extending through the transverse thickness of the web of the I-shaped primary elements, each aperture being confined to a depth of the web of each of the I-shaped primary elements spaced inwardly below and above the parallel edge flanges thereof a distance equal to ½ to 1½ times the uniform thickness of said web of the primary elements, each aperture being substantially complementary in outline and area to the transverse cross-section of each cross-lacing element and receiving the same axially extending therethrough with the flanges of the cross-lacing element parallel to the opposite parallel edge flanges of the primary elements, the flanges of each cross-lacing element being provided with axially spaced marginal open entrance slots interrupting the contiguous length thereof, the said slots each having a depth less than the uniform width of the extending flanges and providing an imperforate area adjacent the root of each slot, said flanges of each cross-lacing element between the slots therein being angularly deflected out of registry with those portions of the apertures in the primary elements initially receiving the same, the slots in each instance having a width providing an interference fit with the transverse width of the marginal edge flanges of the I-shaped primary elements, and said angularly deflected flanges of the cross-lacing elements providing interference displacement of the imperforate areas adjacent the root of each slot in each of the flanges thereof to displace the imperforate root material and provide an outwardly struck contiguous saddle formation embracing opposite sides of the web of the I-shaped primary element, as well as contiguous embracing contact with the opposite walls defining the aperture in the I-shaped primary element in substantially the long transverse axis of the web of each cross-lacing element, the said outwardly struck saddle formations exerting wedging pressure and securement of the cross-lacing elements on opposite walls defining the apertures in the I-shaped primary elements in the aforesaid long transverse axis of the webs of each said cross-lacing element.

8. An open architectural grid structure of the class described comprising a plurality of parallel spaced similar primary elements of substantially I-shaped transverse cross-section, parallel spaced secondary transverse cross-lacing elements adapted to form a cruciform interlocking unitary rigid assembly with the primary elements, said cross-lacing elements being initially defined in transverse cross-section by a web and a pair of integral spaced parallel flanges extending therefrom, axially spaced and aligned apertures extending through the transverse thickness of the web of the I-shaped primary elements, each aperture being confined to a depth of the web of each of the I-shaped primary elements spaced inwardly below and above the parallel edge flanges thereof a distance equal to ½ to 1½ times the uniform thickness of said web of the primary elements, each aperture being substantially complementary in outline and area to the transverse cross-section of each cross-lacing elements and receiving the same axially extending therethrough with the flanges of the cross-lacing element parallel to the opposite parallel edge flanges of the primary elements, the flanges of each cross-lacing element being provided with axially spaced marginal open entrance slots interrupting the contiguous length thereof, the said slots each having a depth less than the uniform width of the extending flanges, a curvilinear end wall, and providing an imperforate area adjacent the root of each slot, said flanges of each cross-lacing element between the slots therein being angularly deflected out of registry with those portions of the apertures in the primary elements initially receiving the same, the slots in each instance having a width providing an interference fit with the transverse width of the marginal edge flanges of the I-shaped primary elements, and said angularly deflected flanges of the cross-lacing elements providing interference displacement of the imperforate areas adjacent the root of each slot in each of the flanges thereof to displace the imperforate root material and provide an outwardly struck contiguous saddle formation embracing opposite sides of the web of the I-shaped primary element and contiguous embracing contact with the opposite walls defining the aperture in the I-shaped primary element in substantially the long transverse axis of the web of each cross-lacing element, the said outwardly struck saddle formations exerting wedging pressure and securement of the cross-lacing elements on opposite walls defining the apertures in the I-shaped primary elements in the aforesaid long transverse axis of the webs of each said cross-lacing element.

9. A unitary structural grating of the class described comprising a plurality of parallel spaced similar primary elements of extruded wrought heat-treated aluminum alloy in substantially I-shaped transverse cross-section, parallel spaced similar secondary cross-lacing-elements of extruded wrought heat-treated aluminum alloy adapted to form a rigid assembly incorporating intersecting cruciform joints between the primary and secondary elements, said primary elements exhibiting a Brinell hardness number in excess of the secondary elements within the range 20 to 40, said cross-lacing elements being initially defined in transverse cross-section by a web and a pair of integral spaced parallel flanges extending therefrom, axially spaced and aligned apertures extending through the transverse thickness of the web of the I-shaped primary elements, each aperture being confined to a depth of the web of each of the I-shaped primary elements spaced inwardly below and above the parallel edge flanges thereof a distance equal to ½ to 1½ times the uniform thickness of said web of the primary elements, each aperture being substantially complementary in outline and area to the transverse cross-section of each cross-lacing element and receiving the same axially extending therethrough with the flanges of the cross-lacing element parallel to the opposite parallel edge flanges of the primary elements, the flanges of each cross-lacing element being provided with axially spaced marginal open entrance slots interrupting the contiguous length thereof, the said slots each having a depth less than the uniform width of the extending flanges and providing an imperforate area adjacent the root of each slot, said flanges of each cross-lacing element between the slots therein being angularly deflected out of registry with those portions of the apertures in the primary elements initially receiving the same, the slots in each instance having a width providing an interference fit with the width of the marginal edge flanges of the I-shaped primary elements, and said angularly deflected flanges of the cross-lacing elements providing interference displacement of the imperforate areas adjacent the root of each slot in each of the flanges thereof to displace imperforate root material and provide an outwardly struck contiguous saddle formation embracing opposite sides of the web of the I-shaped primary element and contiguous embracing contact with the opposite walls defining the aperture in the I-shaped primary element in substantially the long transverse axis of the web of each cross-lacing element, the said outwardly struck saddle formations exerting wedging pressure and securement of the cross-lacing elements on opposite walls defining the apertures in the I-shaped primary elements in the aforesaid long transverse axis of the webs of each said cross-lacing element.

10. A unitary traffic and load-carrying grating of the class described comprising a plurality of parallel spaced similar primary load-bearing elements of wrought heat-treated aluminum alloy in substantially I-shaped transverse cross-section, parallel spaced similar cross-lacing elements of wrought heat-treated aluminum alloy adapted to form a rigid assembly incorporating intersecting cruciform joints between the primary and secondary elements, said grating being capable of resisting direct and reverse bending under loading normal to the unitary grating, said primary elements exhibiting a Brinell hardness number in excess of the secondary elements within the range 20 to 40, said cross-lacing elements being initially defined in transverse cross-section by a web and a pair of integral spaced parallel flanges extending therefrom, axially spaced and aligned apertures extending through the transverse thickness of the web of the I-shaped primary elements, each aperture being confined to a depth of the web of each of the I-shaped primary elements spaced inwardly below and above the parallel edge flanges thereof a distance equal to ½ to 1½ times the uniform thickness of said web of the primary elements, each aperture being substantially complementary in outline and area to the transverse cross-section of each cross-lacing element and receiving the same axially extending therethrough with the flanges of the cross-lacing element parallel to the opposite parallel edge flanges of the primary elements, the flanges of each cross-lacing element being provided with axially spaced marginal open entrance slots interrupting the contiguous length thereof, the said slots each having a depth less than the uniform width of the extending flanges and providing an imperforate area adjacent the root of each slot, said flanges of each cross-lacing element between the slots therein being angularly deflected out of registry with those portions of the apertures in the primary elements initially receiving the same, the slots in each instance having a width providing an interference fit with the width of the marginal edge flanges of the I-shaped primary elements, and said angularly deflected flanges of the cross-lacing elements providing interference displacement of the imperforate areas adjacent the root of each slot in each of the flanges thereof to displace imperforate root material and provide an outwardly struck contiguous saddle formation embracing opposite sides of the web of the I-shaped primary element and contiguous embracing contact with the opposite walls defining the aperture in the I-shaped primary element in substantially the long transverse axis of the web of each cross-lacing element, the said outwardly struck saddle formations exerting wedging pressure and securement of the cross-lacing elements on opposite walls defining the apertures in the I-shaped primary elements in the aforesaid long transverse axis of the webs of each said cross-lacing element.

References Cited by the Examiner

UNITED STATES PATENTS 1,977,299  10/34  Bates _____ 189—82

FOREIGN PATENTS 296,870  9/28  Great Britain.

RICHARD W. COOKE, Jr., *Primary Examiner.*

UNITED STATES PATENT OFFICE
CERTIFICATE OF CORRECTION

Patent No. 3,177,990                                    April 13, 1965

Ronald L. Flucker et al.

It is hereby certified that error appears in the above numbered patent requiring correction and that the said Letters Patent should read as corrected below.

Column 2, line 32, for "assembly" read -- assembled --; column 6, line 26, for "mangesium" read -- magnesium --; line 39, for "structure" read -- structures --; lines 49 and 50, for "represenative" read -- representative --; line 64, for "aid" read -- said --; same column 6, line 67, for "leat" read -- least --; column 7, line 54, for "flang" read -- flange --; column 8, line 38, for "glass" read -- class --; column 9, line 16, for "cross-latching" read -- cross-lacing --; column 10, line 70, for "elements" read -- element --; column 11, line 30, for "cross-lacing-elements" read -- cross-lacing elements --.

Signed and sealed this 24th day of August 1965.

(SEAL)
Attest:

ERNEST W. SWIDER                          EDWARD J. BRENNER
Attesting Officer                       Commissioner of Patents